United States Patent
Oono

(10) Patent No.: US 9,555,668 B2
(45) Date of Patent: Jan. 31, 2017

(54) TIRE

(75) Inventor: Takashi Oono, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 680 days.

(21) Appl. No.: 14/002,488

(22) PCT Filed: Mar. 1, 2012

(86) PCT No.: PCT/JP2012/055244
§ 371 (c)(1),
(2), (4) Date: Aug. 30, 2013

(87) PCT Pub. No.: WO2012/118148
PCT Pub. Date: Sep. 7, 2012

(65) Prior Publication Data
US 2013/0333816 A1 Dec. 19, 2013

(30) Foreign Application Priority Data

Mar. 3, 2011 (JP) ................... 2011-046343

(51) Int. Cl.
*B60C 11/03* (2006.01)
*B60C 11/04* (2006.01)
(Continued)

(52) U.S. Cl.
CPC .............. *B60C 11/03* (2013.01); *B60C 11/042* (2013.04); *B60C 11/11* (2013.01); *B60C 11/13* (2013.01);
(Continued)

(58) Field of Classification Search
CPC .... B60C 11/042; B60C 11/11; B60C 11/1323; B60C 11/03; B60C 11/13; B60C 2011/0355; B60C 2011/0339; B60C 2011/0341; B60C 2011/0353; B60C 2011/0365; B60C 2011/0367; B60C 2011/0369; B60C 11/1353
(Continued)

(56) References Cited

U.S. PATENT DOCUMENTS 4,284,115 A * 8/1981 Ohnishi .............. B60C 11/0309
152/209.13
5,176,769 A * 1/1993 Kadota ................. B60C 9/2009
152/523
(Continued)

FOREIGN PATENT DOCUMENTS

EP 2213484 A1 8/2010
JP 5-338412 A 12/1993
(Continued)

OTHER PUBLICATIONS

English Abstract for JP 2001-401688, published on May 8, 2001.*
(Continued)

*Primary Examiner* — Seyed Masoud Malekzadeh
(74) *Attorney, Agent, or Firm* — Sughrue Mion, PLLC

(57) ABSTRACT

In the tire (1), a region of the tread portion (10) overlapping with a range of 80% of a length of the circumferential belt layer (40) in a tread widthwise direction around a tire equator line CL is a central region CR in the tire radial direction trd, and a remaining region of the tread portion (10) is a terminal region TR, a maximum curvature radius of the arc portion of the central circumferential groove 50*a* is R1, a minimum curvature radius of the arc portion of the terminal circumferential groove 50*b* is R2, a maximum depth in the tire radial direction trd from the tread surface (11) to a groove bottom 55*a* of the central circumferential groove 50*a* is D1, a maximum depth in the tire radial direction trd from the tread surface (11) to a groove bottom 55*b* of the terminal circumferential groove 50*b* is D2, and a relationship of R1/D1≤0.130 and a relationship of R2/D2>0.195 are satisfied.

5 Claims, 5 Drawing Sheets

(51) Int. Cl.
*B60C 11/11* (2006.01)
*B60C 11/13* (2006.01)

(52) U.S. Cl.
CPC ........ *B60C 11/1323* (2013.04); *B60C 11/1353* (2013.04); *B60C 2011/0339* (2013.04); *B60C 2011/0341* (2013.04); *B60C 2011/0353* (2013.04); *B60C 2011/0355* (2013.04); *B60C 2011/0365* (2013.04); *B60C 2011/0367* (2013.04); *B60C 2011/0369* (2013.04)

(58) Field of Classification Search
USPC ................. 152/209.18, 209.25, 209.3, 209.9
See application file for complete search history.

(56) References Cited

U.S. PATENT DOCUMENTS

| | | | | |
|---|---|---|---|---|
| 5,377,734 A | * | 1/1995 | Klein | B60C 11/11 152/209.11 |
| 5,417,268 A | * | 5/1995 | Kishi | B60C 11/0309 152/209.18 |
| 5,450,885 A | * | 9/1995 | Hanya | B60C 11/0083 152/209.26 |
| 5,458,173 A | * | 10/1995 | Yamashita | B60C 9/2006 152/209.14 |
| 6,142,200 A | * | 11/2000 | Feider | B60C 11/0309 152/209.14 |
| 2008/0047643 A1 | | 2/2008 | Takahashi | |
| 2010/0116395 A1 | * | 5/2010 | Andou | B60C 11/01 152/209.25 |

FOREIGN PATENT DOCUMENTS

| | | | | |
|---|---|---|---|---|
| JP | 2001-121923 | * | 5/2001 | ............. B60C 11/11 |
| JP | 2004-196141 A | | 7/2004 | |
| WO | 2010/041720 A1 | | 4/2010 | |

OTHER PUBLICATIONS

Communication dated Nov. 3, 2014 from the European Patent Office in counterpart application No. 12752948.5.
International Search Report of PCT/JP2012/055244 dated May 22, 2012.

* cited by examiner

TIRE

CROSS REFERENCE TO RELATED APPLICATIONS

This application is a National Stage of International Application No. PCT/JP2012/055244, filed on Mar. 1, 2012, which claims priority from Japanese Patent Application No. 2011-046343, filed on Mar. 3, 2011, the contents of all of which are incorporated herein by reference in their entirety.

TECHNICAL FIELD

The present invention relates to a tire provided with a tread portion having a tread surface that comes into contact with a road surface and a circumferential groove that extents in a tire circumferential direction, the tire being a tire characterized in that in a cross section taken along a direction orthogonal to an extension direction of a circumferential groove and along a tire radial direction, a groove bottom of the circumferential groove has an arc portion that is formed in an arc shape of which a center is positioned outside of the tire radial direction.

BACKGROUND ART

In recent years, a low-profile tire has become widely used in response to a request for increasing a speed and lowering a floor level of a vehicle. A tread portion of the low-profile tire is grown in the tire radial direction by applying an internal pressure. Due to the growth in the tire radial direction, there has been concentration of a stress on a groove bottom of a tire circumferential groove and then a crack (a so called groove crack) occurs in the groove bottom.

As a tire to restrain the occurrence of the groove crack, conventionally, there is widely known a tire in which a groove bottom of a circumferential groove is formed in an arc shape and then a curvature radius increases in a cross section taken along a direction orthogonal to an extension direction of a circumferential groove and along a tire radial direction (refer to PTL 1, for example). By increasing the curvature radius of the groove bottom, concentration of a stress on the groove bottom has been restrained. In this manner, the occurrence of the groove crack has been suppressed.

CITATION LIST

Patent Literature

PTL 1: Japanese Patent Application Publication No. 5-338412

SUMMARY OF THE INVENTION

In recent years, there has been a need to reduce a rolling resistance of a tire in response to a growing demand for consideration of environment. The rolling resistance greatly increases due to deformation of a tread portion. Therefore, it is considered to increase a compression rigidity of the tread portion and then restrain the deformation of the tread portion, thereby reducing the rolling resistance. As an effective means for increasing the compression rigidity of the tread portion, there can be exemplified reducing a groove volume.

However, in the tire of PTL 1, a curvature radius of the groove bottom is great and thus the groove volume of the circumferential groove reaches a predetermined value or more. The groove volume cannot be reduced and thus the compression rigidity of the tread portion decreases, and it has been difficult to reduce the rolling resistance.

Thus, compatibleness between restraint of the groove crack and reduction of the rolling resistance has been difficult.

Accordingly, the present invention has been made in view of such a circumstance, and it is an object of the present invention to provide a tire provided with a tread portion having a tread surface that comes into contact with a road surface and a circumferential groove that extents in a tire circumferential direction, in cross section taken along a direction orthogonal to an extension direction of a circumferential groove and along a tire radial direction, a groove bottom of the circumferential groove having an arc portion that is formed in an arc shape, and in a tire radial direction, a center of an arc constituting the arc portion being located outside of the groove bottom, the tire concurrently fulfilling the restraint of the occurrence of the groove crack and the reduction of the rolling resistance.

In order to solve the aforementioned problem, the present invention has a following feature. The feature of the present invention is summarized as follows. A tire which comprises a tread portion (tread portion 10) having a tread surface (tread surface 11) that comes into contact with a road surface and a circumferential groove (circumferential groove 50) that extends in a tire circumferential direction (tire circumferential direction tcd), in a cross section taken along a direction orthogonal to an extension direction of the circumferential groove and along a tire radial direction (tire radial direction trd), a groove bottom (groove bottom 55) of the circumferential groove having an arc portion that is formed in an arc shape, and a center of an arc constituting the arc portion being positioned outside of the groove bottom in the tire radial direction, the tire comprises: a circumferential belt layer (circumferential belt layer 40a) located inside of the tread portion and extending in the tire circumferential direction; and a crossing belt layer (crossing belt layer 40b) located outside of the circumferential belt layer in the tire radial direction, wherein a region of the tread portion overlapping a portion of the circumferential belt layer in the tire radial direction is a central region (central region CR) such that the overlapping portion has a 80% width of the circumferential belt layer in a tread widthwise direction (tread widthwise direction twd) with a center thereof positioned at a tire equator line, and a remaining region of the tread portion is a terminal region (terminal region TR), wherein the circumferential groove located in the central region is a central circumferential groove (central circumferential groove 50a), and the circumferential groove located in the terminal region is a terminal circumferential groove (terminal circumferential groove 50b), wherein a maximum curvature radius of the arc portion of the central circumferential groove is R1, a minimum curvature radius of the arc portion of the terminal circumferential groove is R2, a maximum depth in the tire radial direction from the tread surface to a groove bottom of the central circumferential groove is D1, a maximum depth in the tire radial direction from the tread surface to a groove bottom of the terminal circumferential groove is D2, and a relationship of $R1/D1 \leq 0.130$ and a relationship of $R2/D2 > 0.195$ are satisfied.

According to the feature of the present invention, the tire comprises a circumferential belt layer extending in a tire circumferential direction and a crossing belt layer located outside of the circumferential belt layer in the tire radial direction. By means of the circumferential belt layer and the crossing belt layer, the growth of the tread portion attributed to applying the internal pressure in the tire radial direction is restrained in the tread portion located of a central region. Thus, in a central circumferential groove, the occurrence of the groove crack is restrained. In addition, a terminal circumferential groove satisfies the relationship of R2/D2>0.195. In this manner, the curvature radius of the groove bottom in a terminal circumferential groove can be kept large and thus concentration of a stress on the groove bottom is restrained. As a result, the occurrence of the groove crack is restrained.

Further, the central circumferential groove satisfies the relationship of R1/D1≤0.130. In this manner, the groove volume of the central circumferential groove is kept small and thus the compression rigidity of the tread portion increases, and the rolling resistance can be reduced.

Furthermore, a ground non-contact area of the tread surface may be 20% or smaller with respect to an area of the tread surface.

Furthermore, the tread portion may have at least two or more land portion (land portion row 61 to land portion row 67) interposed by the circumferential groove in the tread widthwise direction, and at a time of ground contact, the land portion row may come into contact with the adjacent land portion row through the circumferential groove therebetween.

Furthermore, the land portion rows may be divided into a plurality of blocks by a plurality of widthwise grooves (widthwise groove 70) extending in the tread widthwise direction, and the blocks may be formed in a substantially hexagonal shape as viewed in a tire radial direction.

Furthermore, a relationship of R1/D1>0.05 may be satisfied.

Furthermore, a relationship of R2/D2<0.3 is satisfied.

It is to be noted that ground contact is ground contact when a pneumatic tire is mounted on a standard rim specified in JATMA YEAR BOOK (The Version in the Year of 2008, A Standard by Japanese Automobile Tire Manufacturers Association), filled with 100% of a pneumatic pressure (a maximum pneumatic pressure) corresponding to a maximum load capacity in an applicable size/ply rating in JATMA YEAR BOOK (the bold-written load in an internal pressure-load pressure correlation table) as an internal pressure, and to which the maximum load capacity is loaded. In the case where a TRA standard or an ETRTO standard is applied in a use location or a manufacturing location, either one of the standards needs to be observed.

DESCRIPTION OF THE EMBODIMENT

Figure 1:
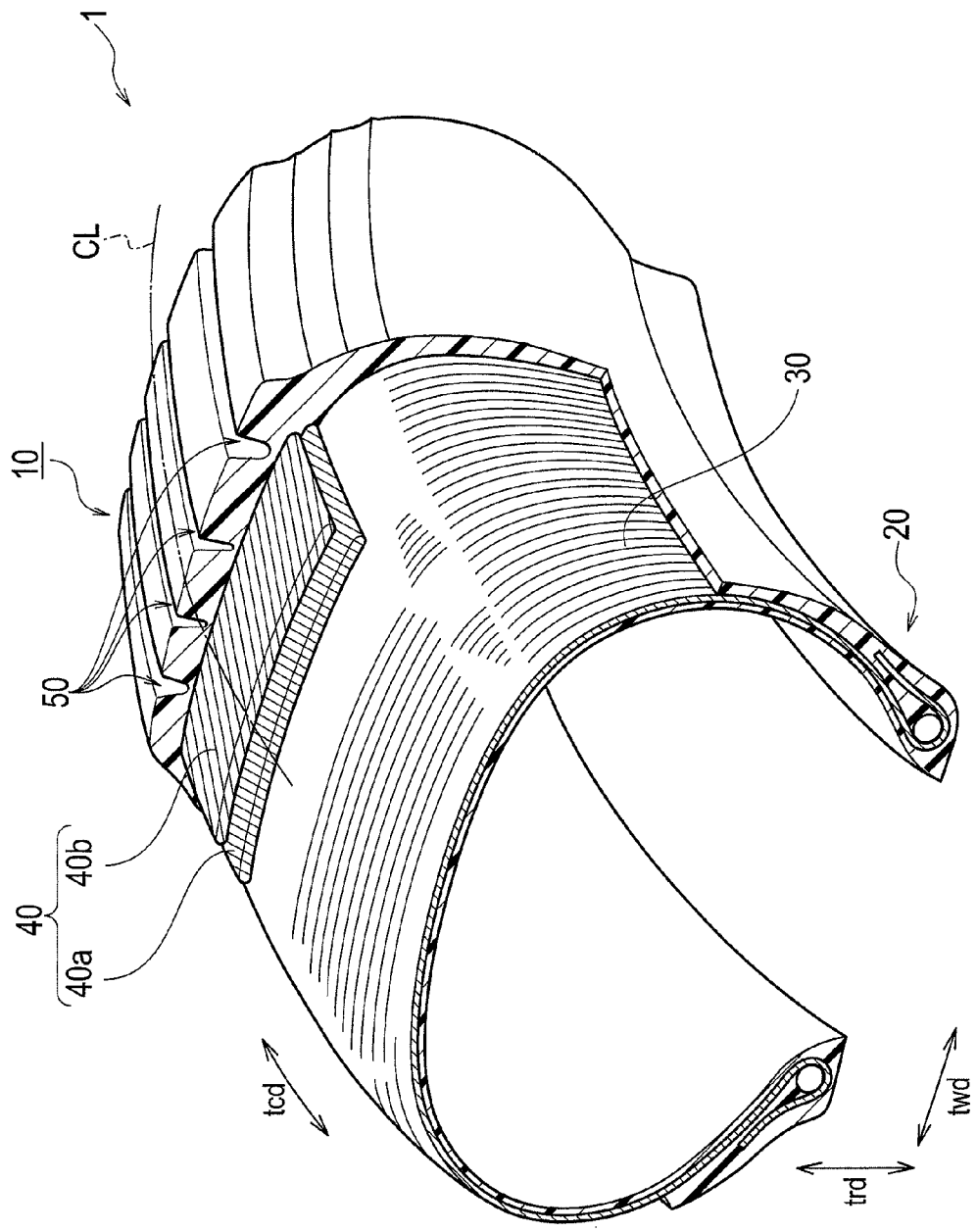
FIG. 1 is a partially perspective view of the tire 1 according to the embodiment.

An example of the tire according to the present invention will be described with reference to the drawings. Specifically, the description will be given of (1) Schematically Illustrated Structure of Tire 1, (2) Schematically Illustrated Structure of Circumferential Groove 50, (3) Operation and Effect, (4) Comparative Example, and (5) Other Embodiments.

In the following description of the drawings, the same or similar reference numerals are used to designate the same or similar parts. It will be appreciated that the drawings are schematically shown and the ratio and the like of each dimension are different from the real ones. Therefore, a specific dimension should be determined in view of the following description. Moreover, among the drawings, the respective dimensional relations or ratios may differ.

(1) Schematically Illustrated Structure of Tire 1

Figure 2:
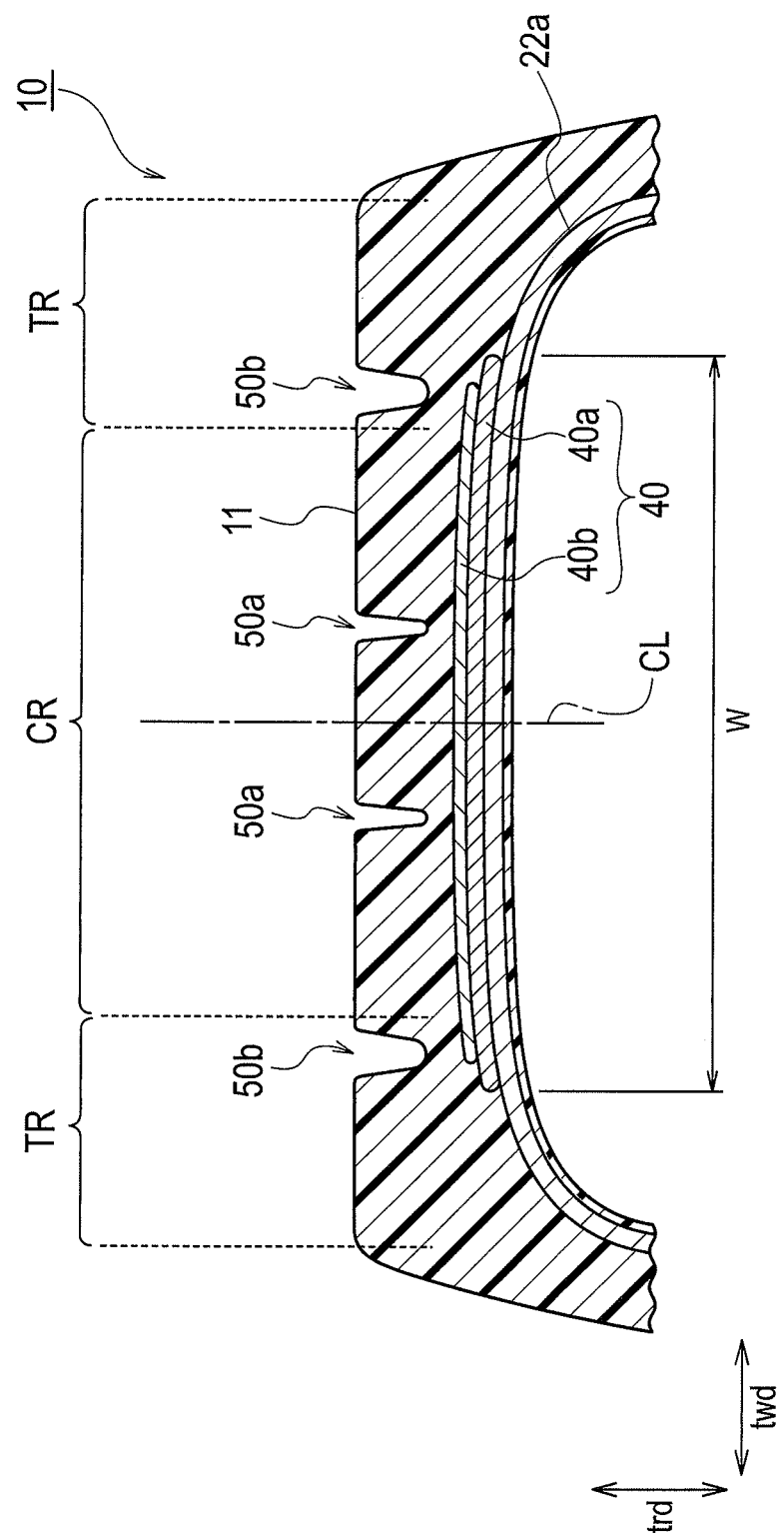
FIG. 2 is a sectional view taken along a tire radial direction trd and a tread widthwise direction twd.

A schematically illustrated structure of a tire 1 according to the embodiment will be described with reference to FIG. 1 and FIG. 2. FIG. 1 is a partially perspective view of the tire 1 according to the embodiment. FIG. 2 is a sectional view taken along a tire radial direction trd and a tread widthwise direction twd.

As shown in FIG. 1 and FIG. 2, the tire 1 is provided with a tread portion 10, a bead portion 20, a carcass layer 30, and a belt layer 40.

The tread portion 10 has a tread surface 11 and a circumferential groove 50. The tread surface 11 comes into contact with a road surface. The circumferential groove 50 is a main groove extending in a tire circumferential direction tcd. The circumferential groove 50 has a central circumferential groove 50a and a terminal circumferential groove 50b. A detailed description of the central circumferential groove 50a and the terminal circumferential groove 50b will be given later. It is to be noted that in FIG. 1 and FIG. 2, while only the circumferential groove 50 is formed in the tread portion 10, a sipe or any other groove may be formed.

The bead portion 20 has a bead core and a bead filer. The bead core is provided in order to fix the tire 1 to a rim. The bead filler is provided in order to increase a rigidity of the bead portion.

The carcass layer 30 is disposed so as to extend between one pair of bead portions. The carcass layer 30 is folded to the outside in a tread widthwise direction twd while enveloping the bead core and the bead filler in the bead portion 20. The carcass layer 30 is disposed to be more inside than the belt layer 40 in the tire radial direction trd. Therefore, from the inside to the outside in the tire radial direction trd, the carcass layer 30 and the belt layer 40 (a crossing belt layer 40b, a circumferential belt layer 40a) are laminated in sequential order. The carcass layer 30 is made of a carcass cord and a rubber.

The belt layer 40 is located in the tread portion 10. The belt layer 40 is located inside of the tread portion 10 in the tire radial direction trd. The belt layer 40 can be preferably formed by winding a rubber-steel cord complex strip made by covering a plurality of cords with a rubber in a spiral manner along the tire circumferential direction tcd.

The belt layer 40 is made of a circumferential belt layer 40a and a crossing belt layer 40b. The circumferential belt layer 40a extends in the tire circumferential direction tcd. The crossing belt layer 40b is located outside of the circumferential belt layer 40a in the tire radial direction trd. The crossing belt layer 40b extends in the tire circumferential direction tcd. Arrangement directions of cords of the circumferential belt layer 40a and the crossing belt layer 40b are different from each other. A cord of the crossing belt layer 40b crosses a cord of the circumferential belt layer 40a in a tread planer view. It is to be noted that while the circumferential belt layer 40a is made of one belt layer, the circumstantial belt layer may be made of two or more belt layers.

As shown in FIG. 2, the tread portion 10 is divided into a central region CR and a terminal region TR. The central region CR is a region of the tread portion 10 overlapping with a portion of the circumferential belt layer 40a in the tire radial direction trd, such that the overlapping portion is 80% width W of the circumferential belt layer 40a in the tread widthwise direction twd with a center thereof positioned at a tire equator line CL. The terminal region TR is a remaining region of the tread portion 10 that is not included in the central region CR. The terminal region TR is a region of the tread portion 10 overlapping with another portion of the circumferential belt layer 40a in the tire radial direction trd, such that the overlapping portion has 10% width W of the circumferential belt layer 40a in the tread widthwise direction twd from each end part of the circumferential belt layer 40a in the tread widthwise direction twd toward the inside of the tread widthwise direction. Therefore, as viewed in the tire radial direction trd (that is, in the tread planer view), the tread portion 10 from the tire equator line CL to a position advancing to the outside of the tread widthwise direction twd by a length of 40% of the length W of the circumferential belt layer 40a in the tread widthwise direction trd is the central region CR. As viewed in the tire radial direction trd, the tread portion 10 at the outside in the tread widthwise direction twd from a position advancing to the outside from the tire equator line CL in the tread widthwise direction by a length of 40% of the length W of the circumferential belt layer 40a in the tread widthwise direction twd is the terminal region TR. It is to be noted that in the case where the circumferential belt layer 40a is made of a plurality of belt layers, the central region CR and the terminal region TR are defined by the widest circumferential belt layer in the tread widthwise direction twd. That is, the central region CR is a region of the tread portion 10 overlapping in the tire radial direction trd with a range of 80% of the length W of the widest circumferential belt layer in the tread widthwise direction twd around the tire equator line CL.

It is preferable that a ground non-contact area of the tread surface 11 be 20% or smaller with respect to an area of the tread surface 11 (that is, a total area between the ground non-contact area of the tread surface 11 and a ground contact area of the tread surface 11). That is, it is preferable that a negative ratio of the tire 1 be 20% or smaller.

(2) Schematically Illustrated Structure of Circumferential Groove 50

Figure 3:
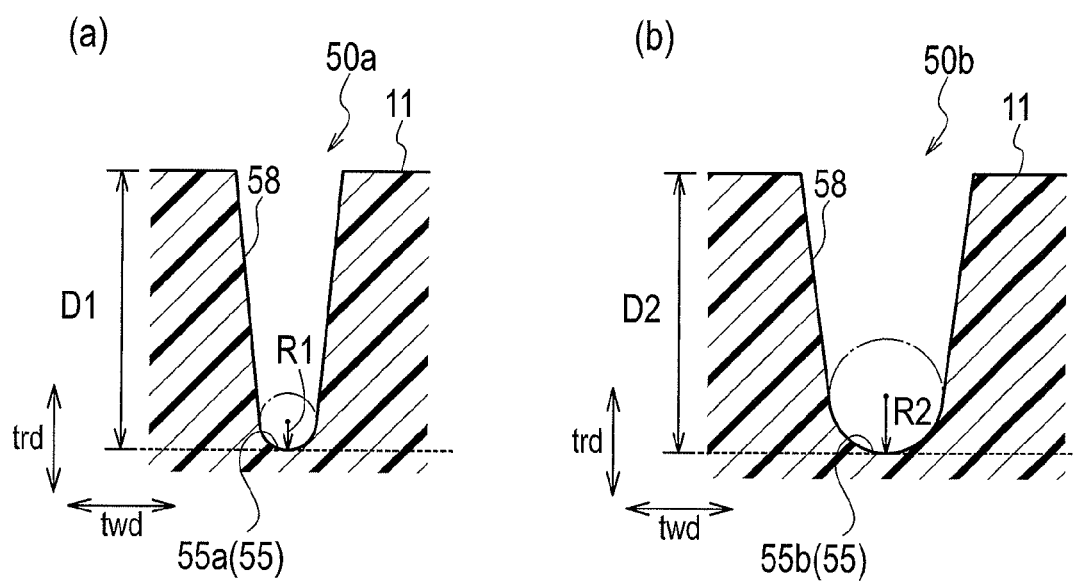
FIG. 3: (a) is an enlarged view of the central circumferential groove 50a of FIG. 2, (b) is an enlarged view of the terminal circumferential groove 50b of FIG. 2.

A schematically illustrated structure of the circumferential groove 50 according to the embodiment will be described with reference to FIG. 2 and FIG. 3. FIG. 3 (a) is an enlarged view of the central circumferential groove 50a of FIG. 2. FIG. 3 (b) is an enlarged view of the terminal circumferential groove 50b of FIG. 2. It is to be noted that FIG. 3 (a) and FIG. 3 (b) are also sectional views taken along the direction orthogonal to the extension direction of the circumferential groove 50 and along the tire radial direction trd.

In the present embodiment, the circumferential groove 50 extends along the tire circumferential direction tcd. The extension direction of the circumferential groove 50 is a direction in which the circumferential groove 50 extends. Therefore, the direction orthogonal to the extension direction of the circumferential groove 50 is parallel to the tread widthwise direction twd. Accordingly, FIG. 3 (a) and FIG. 3 (b) are sectional views taken along the tread widthwise direction twd and the tire radial direction trd, respectively.

As described above, the circumferential groove 50 has a central circumferential groove 50a and a terminal circumferential groove 50b. In the tire radial direction trd, the central circumferential groove 50a is a circumferential groove 50 located in the central region CR. The terminal circumferential groove 50b is a circumferential groove 50 located in the terminal region TR.

As shown in FIG. 3, the circumferential groove 50 is configured by a groove bottom 55 and a side surface 58. The groove bottom 55 is formed in an arc shape of which a center is located outside of the groove bottom 55 in the tire radial direction trd. Therefore, the groove bottom 55 has an arc portion that is formed in an arc shape. In the tire radial direction trd, a center of an arc constituting the arc portion is located outside of the groove bottom 55. That is, a center of a circle along the arc portion is located outside of the groove bottom 55.

As shown in FIG. 3, a maximum curvature radius of an arc portion (a groove bottom 55a) of the central circumferential groove 50a is R1. A minimum curvature radius of the arc portion (a groove bottom 55b) of the terminal circumferential groove 50b is R2. A maximum depth in the tire radial direction trd from the tread surface 11 to the groove bottom 55a of the central circumferential groove 50a is D1. A maximum depth in the tire radial direction trd from the tread surface 11 to the groove bottom 55b of the terminal circumferential groove 50b is D2. The tire 1 according to the present embodiment satisfies the relationships of $R1/D1 \leq 0.130$ and $R2/D2 > 0.195$. That is, the central circumferential groove 50a is formed so as to satisfy the relationship of $R1/D1 \leq 0.130$. The terminal circumferential groove 50b is formed so as to satisfy the relationship of $R2/D2 > 0.195$.

It is preferable that the tire 1 satisfy the relationship of $R1/D1 > 0.05$. That is, it is preferable that the central circumferential groove 50a be formed so as to satisfy the relationship of $R1/D1 > 0.05$. In addition, it is preferable that the tire 1 satisfy the relationship of $R2/D2 \leq 0.3$. That is, it is preferable that the terminal circumferential groove 50b be formed so as to satisfy the relationship of $R2/D2 < 0.3$.

It is preferable that D1 and D2 be in a range of 8 mm to 24 mm. In this manner, the compression rigidity can be increased while the drainage performance is ensured.

It is to be noted that R1, R2, D1, and D2 are respectively R1, R2, D1, and D2 taken along the direction orthogonal to the extension direction of the circumferential groove 50 and along the tire radial direction trd. In the present embodiment, R1, R2, D1, and D2 are obtained in the cross section taken along the tread widthwise direction twd and the tire radial direction trd.

In addition, in the cross section taken along the direction orthogonal to the extension direction of the circumferential groove 50 and along the tire radial direction trd, in the embodiment, the center of the arc of the arc portion that constitutes the groove bottom 55a is located in the tire radial direction trd from a portion of the groove bottom 55a that is a maximum depth of the central circumferential groove 50a. Similarly, the center of the arc of the arc portion that constitutes the groove bottom 55b is located in the tire radial direction trd from a portion of the groove bottom 55b that is a maximum depth of the terminal circumferential groove 50b.

(3) Operation and Effect

The tire 1 is provided with the belt layer 40 that is made of the circumferential belt layer 40a and the crossing belt layer 40b and thus in the central region CR, the growth of the tread portion 10 due to application of the internal pressure in the tire radial direction trd is restrained. Therefore, the occurrence of the groove crack of the central circumferential groove 50a that is located in the central region CR is restrained. On the other hand, in the terminal region TR, an advantageous effect of restraining the growth of the tread portion 10 by means of the belt layer 40 is not attained so much and thus the groove crack is prone to occur in the terminal circumferential groove 50b. However, the terminal circumferential groove 50b satisfy the relationship of R2/D2>0.195 such that the curvature radius of the groove bottom is kept large. Therefore, concentration of a stress on the groove bottom 55b is restrained and thus the occurrence of that the groove crack is further restrained. As a result, the occurrence of the groove crack in the central circumferential groove 50a or in the terminal circumferential groove 50b can be restrained.

In addition, the central circumferential groove 50a satisfies R1/D1≤0.130. In this manner, the groove volume of the central circumferential groove 50a is kept small. Therefore, in the central region CR, the compression rigidity of the tread portion 10 increases, and deformation of the tread portion 10 is restrained. As a result, the rolling resistance of the tire 1 is reduced.

Further, in the tire radial direction trd, it is preferable that the ground non-contact area of the tread surface 11 be 20% or smaller with respect to an area of the tread surface 11. In this manner, the groove volume of the circumferential groove 50 is decreased and thus the compression rigidity of the tread portion 10 can be increased more remarkably. As a result, the rolling resistance of the tire 1 is reduced.

It is preferable that the tire 1 satisfy the relationship of R1/D1>0.05. The tire 1 satisfies the relationship of R1/D1>0.05 such that the curvature radius of the groove bottom is maintained. Therefore, concentration of a stress on the groove bottom 55a is restrained and thus a circumstance that the groove crack occurs in the central circumferential groove 50a is further restrained.

Furthermore, it is preferable that the tire 1 satisfy the relationship of R2/D2<0.3. The tire 1 satisfies the relationship of R2/D2<0.3, whereby the groove volume of the terminal circumferential groove 50b is kept small. Therefore, in the terminal region TR, the compression rigidity of the tread portion 10 increases, and deformation of the tread portion 10 is restrained. As a result, the rolling resistance of the tire 1 is further reduced.

(4) Comparative Example

In order to attain the effect of the tire according to the present invention, evaluation was carried out with respect to the rolling resistance and the occurrence of the groove crack.

With a tire of 445/50R22.5 size being mounted on a rim of 14.00×22.5, under a condition of an internal pressure of 690 kPa and a load of 3,860 kgf, the following tests were carried out. It is to be noted that Table 1 shows the curvature radiuses (R1, R2) of the circumferential grooves and the maximum depths (D1, D2) of the tire radial direction of the circumferential grooves in the tire employed for evaluation.

A rate of R1/D1 of Example 1 was 0.130, and a rate of R2/D2 of Example 1 was 0.206. A rate of R1/D1 of Example 2 was 0.087, and a rate of R2/D2 of Example 2 was 0.206. A rate of R1/D1 of Example 3 was 0.130, and a rate of R2/D2 of Example 3 was 0.223. A rate of R1/D1 of Example 4 was 0.087, and a rate of R2/D2 of Example 4 was 0.223. A rate of R1/D1 of Example 5 was 0.108, and a rate of R2/D2 of Example 5 was 0.206. A rate of R1/D1 of Example 6 was 0.050, and a rate of R2/D2 of Example 6 was 0.260. A rate of R1/D1 of Example 7 was 0.043, and a rate of R2/D2 of Example 7 was 0.260. A rate of R1/D1 of Example 8 was 0.087, and a rate of R2/D2 of Example 8 was 0.305. A rate of R1/D1 of Example 9 was 0.087, and a rate of R2/D2 of Example 9 was 0.330. A rate of R1/D1 of Comparative Example 1 was 0.173, and a rate of R2/D2 of Example 1 was 0.190. A rate of R1/D1 of Comparative Example 2 was 0.173, and a rate of R2/D2 of Example 2 was 0.173. A rate of R1/D1 of Comparative Example 3 was 0.087, and a rate of R2/D2 of Example 3 was 0.190. A rate of R1/D1 of Comparative Example 4 was 0.173, and a rate of R2/D2 of Example 4 was 0.206. A rate of R1/D1 of Comparative Example 5 was 0.173, and a rate of R2/D2 of Example 5 was 0.223. A rate of R1/D1 of Comparative Example 6 was 0.130, and a rate of R2/D2 of Example 1 was 0.190.

In Example 1 to Example 9, both the relationship of R1/D1≤0.130 and the relationship of R2/D2>0.195 were satisfied. The rate of R1/D1 of each of the Examples was smaller than 0.173 that was the rate of R1/D1 of Comparative Example 1. That is, the rate of R1/D1 of each of the Examples was 0.130 or smaller. The rate of R2/D2 of each of the Examples was greater than 0.190 that was the rate of R2/D2 of Comparative Example 1. That is, the rate of R2/D2 of each of the Examples was greater than 0.195. Specifically, the rate of R2/D2 of each of the Examples was 0.206 or more.

The rate of R1/D1 of each of the Examples other than that of each of Example 6 and Example 7 was greater than 0.05. The rate of R1/D1 of Example 6 and Example 7 was 0.05 or smaller. The rate of R2/D2 of each of the Examples other than that of each of Example 8 and Example 9 was smaller than 0.3. In Example 8 and Example 9, each of these values was 0.3 or more.

In addition, a negative ratio of each of the Examples other than Example 9 was 20% or smaller. That is, in each of the Examples other than Example 9, the ground non-contact area of the tread surface was 20% or smaller with respect to the area of the tread surface. The negative ratio of each of the Examples was 19% or smaller except in Example 8 and Example 9.

In a rolling resistance test, a vehicle mounting the above mentioned tire thereon was caused to run at a speed of 80 km/h, and a rolling resistance force of the tire at that time was measured. The results are shown in Table 1 and Table 2. In the tables, it is to be noted that the smaller the value is, the smaller the rolling resistance force is and thus the better performance is shown.

In a groove crack test, a vehicle mounting the above mentioned tire thereon was caused to run at a room temperature of 36 degrees Centigrade and at a speed of 60 km/h. A running distance taken until a crack had occurred in circumferential groove was measured. The results are shown in Table 1 and Table 2. In the tables, it is to be noted that the greater the value is, the longer the distance taken until the groove crack occurred is and thus the better performance is shown.

In the rolling resistance test and the groove crack test, other test values are relatively shown with reference to the value (100) of Comparative Example 1.

TABLE 1

|  | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 |
|---|---|---|---|---|---|---|
| D1(mm) | 23.1 | 23.1 | 23.1 | 23.1 | 23.1 | 23.1 |
| R1(mm) | 4 | 4 | 2 | 4 | 4 | 3 |
| R1/D1 | 0.173 | 0.173 | 0.087 | 0.173 | 0.173 | 0.130 |
| D2(mm) | 23.1 | 23.1 | 23.1 | 21.4 | 19.7 | 23.1 |
| R2(mm) | 4.4 | 4 | 4.4 | 4.4 | 4.4 | 4.4 |
| R2/D2 | 0.190 | 0.173 | 0.190 | 0.206 | 0.223 | 0.190 |
| NEGATIVE RATIO (%) | 20 | 19 | 15 | 21 | 22 | 18 |
| TEST VALUE OF ROLLING RESISTANCE | 100 | 99 | 90 | 102 | 104 | 94 |
| TEST VALUE OF GROOVE CRACK | 100 | 80 | 100 | 140 | 155 | 100 |

TABLE 2

|  | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|---|---|
| D1(mm) | 23.1 | 23.1 | 23.1 | 23.1 | 23.1 | 20 | 23.1 | 23.1 | 23.1 |
| R1(mm) | 3 | 2 | 3 | 2 | 2.5 | 1 | 1 | 2 | 2 |
| R1/D1 | 0.130 | 0.087 | 0.130 | 0.087 | 0.108 | 0.050 | 0.043 | 0.087 | 0.087 |
| D2(mm) | 21.4 | 21.4 | 19.7 | 19.7 | 21.4 | 23.1 | 23.1 | 19.7 | 19.7 |
| R2(mm) | 4.4 | 4.4 | 4.4 | 4.4 | 4.4 | 6 | 6 | 6 | 6.5 |
| R2/D2 | 0.206 | 0.206 | 0.223 | 0.223 | 0.206 | 0.260 | 0.260 | 0.305 | 0.330 |
| NEGATIVE RATIO (%) | 19 | 15 | 19 | 17 | 17 | 17 | 18 | 20 | 21 |
| TEST VALUE OF ROLLING RESISTANCE | 90 | 85 | 89 | 83 | 88 | 82 | 85 | 95 | 98 |
| TEST VALUE OF GROOVE CRACK | 150 | 145 | 160 | 158 | 149 | 115 | 120 | 165 | 170 |

As shown in Table 1 and Table 2, in comparison with Comparative Example 1, in Example 1 to Example 9, the rolling resistance value was small, and the groove crack test value was great. From the viewpoint of this fact, in each of the tires according to Examples, it was found that restraint of the occurrence of the groove crack and reduction of the rolling resistance were concurrently fulfilled.

In addition, in Example 1 to Example 5 and Example 8 and Example 9, in comparison with Example 6 and Example 7, the groove crack test value was great. In this point of view, by satisfying the relationship of R1/D1>0.05, it was verified that the occurrence of the groove crack can be further restrained.

Further, in Example 1 to Example 7, in comparison with Example 8 and Example 9, the rolling resistance test value was small. In this point of view, by satisfying the relationship of R2/D2<0.3, it was confirmed that the rolling resistance can be further reduced.

(5) Other Embodiments

The content of the present invention has been disclosed through the embodiment of the present invention. However, it must not be understood that the discussions and the drawings constituting a part of this disclosure limit the present invention. The present invention includes various embodiments that are not described herein.

Figure 4:
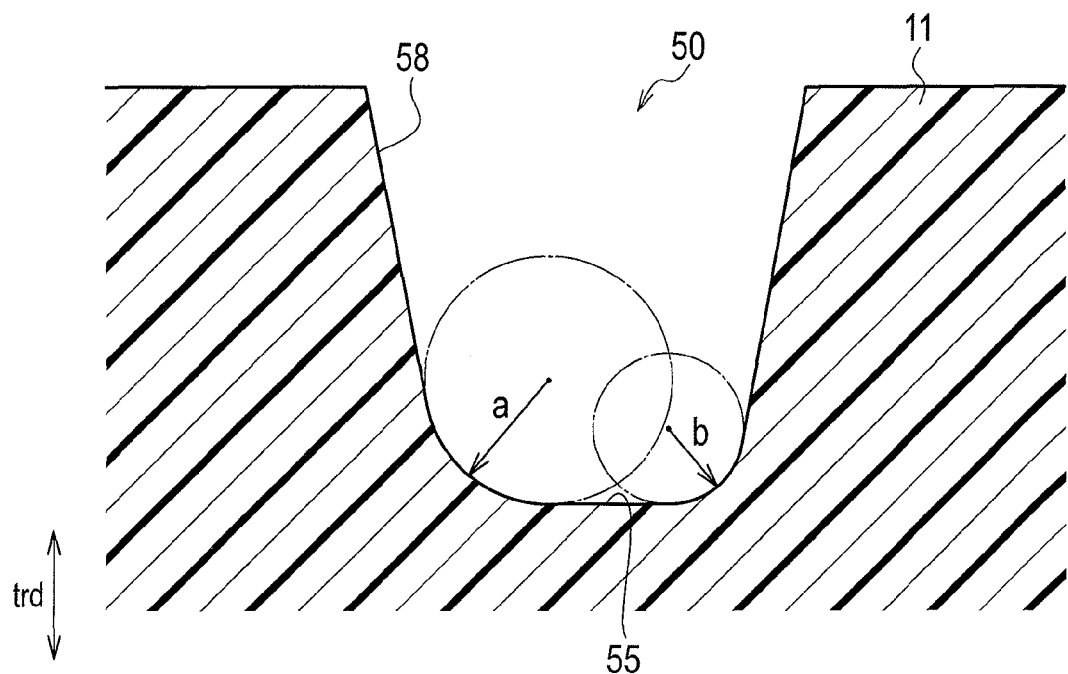
FIG. 4 is a cross section along a direction orthogonal to an extension direction of the circumferential groove 50 according to the other embodiment and the tire radial direction trd.

For example, while in the embodiment described above, the groove bottom 55 had one arc portion, the present invention is not limited thereto. As shown in FIG. 4, the groove bottom 55 may have a plurality of arc portions. In the case where the circumferential groove 50 of FIG. 4 is the central circumferential groove 50a, the maximum curvature radius of the arc portion is a curvature radius a, and the circumferential groove 50 of FIG. 4 is the terminal circumferential groove 50b, the minimum curvature radius of the arc portion is a curvature radius b.

It is to be noted that in the case where the groove bottom 55a of the central circumferential groove 50a includes a plurality of arc portions, the maximum curvature radius is a curvature radius of an arc portion having its largest curvature radius. Therefore, as in the embodiment described above, in the case where the groove bottom 55a of the central circumferential groove 50a includes only one arc portion, the curvature radius of such only one arc portion is the maximum curvature radius.

Similarly, in the case where the groove bottom 55b of the terminal circumferential groove 50b includes a plurality of arc portions, the minimum curvature radius is a curvature radius of an arc portion having its smallest curvature radius. Therefore, as in the embodiment described above, in the case where the groove bottom 55b of the terminal circumferential groove 50b includes only one arc portion, the curvature radius of such one arc portion is the minimum curvature radius.

Figure 5:
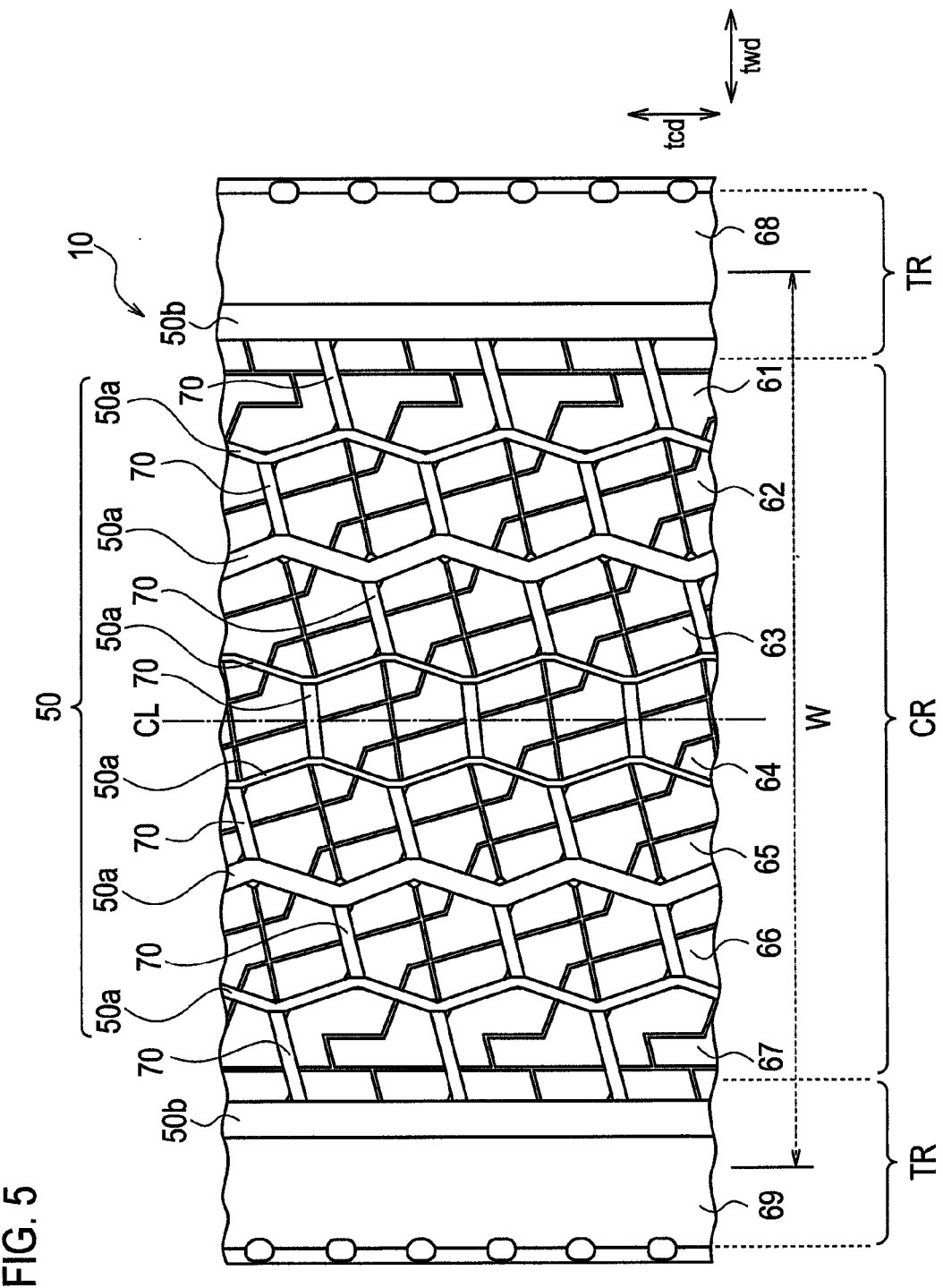
FIG. 5 is an exploded view of the tread pattern of the tire according to the other embodiment.

In addition, the tread portion 10 may have a tread pattern as shown in FIG. 5. FIG. 5 is an exploded view of the tread pattern of the tire according to the other embodiment.

As shown in FIG. 5, the tread portion 10 has a land portion row 61 to a land portion row 69. That is, the tread portion 10 has at least two or more land portion rows. The land portion rows are interposed by the circumferential groove 50 in the tread widthwise direction twd.

The tread portion 10 has eight circumferential grooves 50. Specifically, the tread portion 10 has six central circumferential grooves 50*a* and two terminal circumferential grooves 50*b*. As in the tire 1 mentioned above, the central circumferential groove 50*a* is formed so as to satisfy the relationship of R1/D1≤0.130. The terminal circumferential groove 50*b* is formed so as to satisfy the relationship of R2/D2>0.195.

It is to be noted that in the tire 1 mentioned above, the circumferential groove 50 was taken along the tire circumferential direction tcd and thus the direction orthogonal to the extension direction of the circumferential groove 50 was parallel to the tread widthwise direction twd. In the tire according to the embodiment, the circumferential groove 50 extends in a zigzag manner in the tire circumferential direction tcd. Thus, in the tread planer view (that is, when the tread surface 11 is viewed in the tire radial direction trd), the extension direction of the circumferential groove 50 inclines with respect to the tire circumferential direction tcd. Therefore, the direction orthogonal to the extension direction of the circumferential groove 50 inclined with respect to the tread widthwise direction twd. Here, the values of R1, R2, D1, and D2 are respectively R1, R2, D1, and D2 in the cross section taken along the direction orthogonal to the extension direction of the circumferential groove 50 and along the tire radial direction trd. Therefore, in the embodiment, the values of R1, R2, D1, and D2 are obtained in the cross section taken along the direction inclining with respect to the treat widthwise direction twd and against the tire radial direction trd. At a portion at which the extension direction of the circumferential groove 50 does not incline with respect to the tire circumferential direction tcd, the values of R1, R2, D1, and D2 are obtained in the cross section taken along the tread widthwise direction twd and the tire radial direction trd.

The circumferential groove 50 extends in a zigzag manner in the tire circumferential direction tcd. The groove width in the direction orthogonal to the extension direction of the circumferential groove is different depending upon a position in the tread widthwise direction twd. In the tread widthwise direction twd, the groove width of the central circumferential groove 50*a* that is located inside is the smallest. In the tread widthwise direction twd, that is, the groove width of the central circumferential groove 50*a* that is the closest to the tire equator line CL is the smallest. The central circumferential groove 50*a* having the smallest groove width closes at the time of ground contact with the tread surface 11. In other words, at the time of ground contact, the land portion row 64 comes into contact with the adjacent land portion row 63 and land portion row 65 through the central circumferential groove 50*a* therebetween. In this manner, the land portion rows support each other, whereby deformation of the tread portion 10 is restrained and thus the rolling resistance can be further lowered.

The land portion rows are divided into a plurality of blocks by means of a plurality of widthwise grooves 70 extending in the tread widthwise direction twd. As shown in FIG. 5, as viewed in the tire radial direction tcd, a block surrounded by the circumferential groove 50 and the widthwise groove 70 is formed in a substantially hexagonal shape. The term "substantially hexagonal shape" used herein is expressed such that there may not always need to be a shape formed of six edges. Apex portions of a hexagon may be rounded. In addition, apex portions may be made of short edges. Specifically, as in the block located on the tire equator line in FIG. 5, a shape such as an octal shape formed in consideration of the edges of the apex portions is also included in the substantially hexagonal shape. By forming such a shape, at the time of ground contact (at the time of applying a specified load and a specified pneumatic pressure), the blocks adjacent to each other in the tread widthwise direction twd support each other and thus deformation of the tread portion 10 is restrained, and the rolling resistance can be further lowered.

As in the tire 1, in the tire radial direction trd, it is preferable that the ground non-contact area of the tread surface 11 be 20% or smaller with respect to the area of the tread surface 11.

It is to be noted that the tire according to the present invention may be a pneumatic tire, or alternatively, may be a gas-containing tire other than pneumatic air, containing a rare gas such as argon.

As described above, it is of course that the present invention includes various embodiments and the like not described herein. Therefore, the scope of the present invention is to be defined only by the inventive specific matter according to the adequate claims from the above description.

Note that the entire content of the Japanese Patent Application No. 2011-046343 (filed on Mar. 3, 2011) is incorporated herein by reference.

INDUSTRIAL APPLICABILITY

The present invention provides the tire concurrently fulfilling the restraint of the occurrence of the groove crack and the reduction of the rolling resistance.

The invention claimed is:
1. A tire which comprises
a tread portion having
   a tread surface that comes into contact with a road surface
   and a circumferential groove that extends in a tire circumferential direction,
   in a cross section taken along a direction orthogonal to an extension direction of the circumferential groove and along a tire radial direction,
   a groove bottom of the circumferential groove having one or more arc portions each of which is formed in an arc shape, and
   a center of every arc of the arc portions being positioned outside of tire material,
the tire comprising:
a circumferential belt layer located inside of the tread portion and extending in the tire circumferential direction; and
a crossing belt layer located outside of the circumferential belt layer in the tire radial direction,
wherein
   a region of the tread portion overlapping with a portion of the circumferential belt layer in the tire radial direction is a central region such that the overlapping portion has a 80% width of the circumferential belt layer in a tread widthwise direction with a center thereof positioned on a tire equator line, and
   a remaining region of the tread portion is a terminal region,
wherein
   cords of the crossing belt layer cross cords of the circumferential belt layer, wherein
the circumferential groove located in the central region is a central circumferential groove, and
the circumferential groove located in the terminal region is a terminal circumferential groove,
wherein
a maximum curvature radius of the arc portion of the central circumferential groove is R1,
a minimum curvature radius of the arc portion of the terminal circumferential groove is R2,
a maximum depth in the tire radial direction from the tread surface to a groove bottom of the central circumferential groove is D1,
a maximum depth in the tire radial direction from the tread surface to a groove bottom of the terminal circumferential groove is D2,
a relationship of R1/D1≤0.130 and a relationship of R2/D2>0.195 are satisfied, and
a round non-contact area of the tread surface is 20% or smaller with respect to an area of the tread surface.

2. The tire according to claim 1, wherein
the tread portion has at least two land portion rows interposed by the circumferential groove in the tread widthwise direction, and
wherein
at a time of ground contact, one of the at least two land portion rows comes into contact with the other adjacent one of the at least two land portion rows through the circumferential groove therebetween.

3. The tire according to claim 2, wherein
each of the at least two land portion rows is divided into a plurality of blocks by a plurality of widthwise grooves extending in the tread widthwise direction, and
wherein
each of the blocks is formed in a substantially hexagonal shape as viewed in a tire radial direction.

4. The tire according to claim 1, wherein a relationship of R1/D1>0.05 is satisfied.

5. The tire according to claim 1, wherein a relationship of R2/D2<0.3 is satisfied.

* * * * *